(12) United States Patent
Jang et al.

(10) Patent No.: US 11,398,230 B2
(45) Date of Patent: Jul. 26, 2022

(54) METHOD FOR CONTROLLING PLURALITY OF VOICE RECOGNIZING DEVICES AND ELECTRONIC DEVICE SUPPORTING THE SAME

(71) Applicant: Samsung Electronics Co., Ltd, Suwon-si (KR)

(72) Inventors: Sungwoon Jang, Suwon-si (KR); Sangki Kang, Suwon-si (KR); Namkoo Lee, Suwon-si (KR); Euisuk Chung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 16/590,151

(22) Filed: Oct. 1, 2019

(65) Prior Publication Data

US 2020/0105264 A1    Apr. 2, 2020

(30) Foreign Application Priority Data

Oct. 1, 2018    (KR) .................... 10-2018-0117192

(51) Int. Cl.
*G06F 3/048*    (2013.01)
*G10L 15/22*    (2006.01)
(Continued)

(52) U.S. Cl.
CPC ............ *G10L 15/22* (2013.01); *G06F 3/0485* (2013.01); *G06F 3/167* (2013.01); *G10L 2015/223* (2013.01)

(58) Field of Classification Search
None
See application file for complete search history.

(56) References Cited

U.S. PATENT DOCUMENTS 9,318,112 B2    4/2016    Casado et al.
9,811,818 B1    11/2017    Xing
(Continued)

FOREIGN PATENT DOCUMENTS

JP    H06-236196 A    8/1994
JP    2000-250579 A    9/2000
(Continued)

OTHER PUBLICATIONS

International Search Report in connection with International Application No. PCT/KR2019/012755 dated Jan. 29, 2020, 3 pages.

(Continued)

*Primary Examiner* — William C Trapanese

(57) ABSTRACT

An electronic device includes a display, a microphone, a memory, a communication circuit, and a processor. The processor is configured to display a user interface for adjusting voice recognition sensitivity of each of a plurality of voice recognizing devices configured to start a voice recognition service in response to the same start utterance, through the display, to transmit a value of the changed sensitivity to at least part of the plurality of voice recognizing devices when the voice recognition sensitivity is changed through the user interface, to transmit a signal for waiting to receive a first utterance of a user, to the plurality of voice recognizing devices, to receive utterance information corresponding to the first utterance from the plurality of voice recognizing devices, and to update the user interface based on the utterance information.

14 Claims, 10 Drawing Sheets

(51) Int. Cl.
  *G06F 3/0485* (2022.01)
  *G06F 3/16* (2006.01)

(56) References Cited

U.S. PATENT DOCUMENTS

| | | | |
|---|---|---|---|
| 10,037,757 | B2 | 7/2018 | Kim |
| 10,055,714 | B2 | 8/2018 | Zhou et al. |
| 10,073,953 | B2 | 9/2018 | Xing |
| 10,199,051 | B2 | 2/2019 | Binder et al. |
| 10,832,670 | B2 | 11/2020 | Park et al. |
| 2006/0100866 | A1 | 5/2006 | Alewine et al. |
| 2011/0125489 | A1* | 5/2011 | Shin ............... G10L 21/0316 704/205 |
| 2011/0276636 | A1 | 11/2011 | Cheng et al. |
| 2012/0006891 | A1 | 1/2012 | Zhou et al. |
| 2012/0051560 | A1* | 3/2012 | Sanders ............... H03G 1/02 381/105 |
| 2014/0222436 | A1 | 8/2014 | Binder et al. |
| 2015/0187354 | A1* | 7/2015 | Kim ............... G06F 3/167 704/246 |
| 2016/0063997 | A1* | 3/2016 | Nemala ............... G10L 25/06 704/233 |
| 2017/0323285 | A1 | 11/2017 | Xing |
| 2017/0330565 | A1 | 11/2017 | Daley et al. |
| 2018/0091913 | A1* | 3/2018 | Hartung ............... H03G 3/32 |
| 2018/0211665 | A1 | 7/2018 | Park et al. |
| 2018/0218739 | A1 | 8/2018 | Park et al. |
| 2019/0122692 | A1 | 4/2019 | Binder et al. |
| 2021/0056971 | A1 | 2/2021 | Park et al. |

FOREIGN PATENT DOCUMENTS

| | | |
|---|---|---|
| JP | 2006227634 A | 8/2006 |
| JP | 2008228129 A | 9/2008 |
| KR | 10-2018-0089200 A | 8/2018 |

OTHER PUBLICATIONS

Supplementary European Search Report dated Oct. 11, 2021, in connection with European Application No. 19868587.7, 10 pages.

\* cited by examiner

METHOD FOR CONTROLLING PLURALITY OF VOICE RECOGNIZING DEVICES AND ELECTRONIC DEVICE SUPPORTING THE SAME

CROSS-REFERENCE TO RELATED APPLICATIONS

This application is based on and claims priority under 35 U.S.C. § 119 to Korean Patent Application No. 10-2018-0117192 filed on Oct. 1, 2018 in the Korean Intellectual Property Office, the disclosure of which is incorporated by reference herein its entirety.

BACKGROUND

1. Field

The disclosure relates to a technology associated with a method for controlling a plurality of voice recognizing devices and an electronic device supporting the same.

2. Description of Related Art

Various electronic devices operating in response to the interactive utterance input (or voice input) of a user have been released. For example, an electronic device such as a smartphone or a smart watch may perform various functions, such as making/receiving a call, sending/receiving a message, file transfer, searching for a web page, or the like, in response to the voice input of the user.

For another example, the electronic device such as a TV, a speaker, or a refrigerator may perform an operation, such as power on/off, playing a video, playing music, or the like, in response to the voice input of the user.

An electronic device operating in response to the voice input of the user (hereinafter referred to as a "voice recognizing device") may enter a standby state where the utterance input of the user is capable of being received, in response to an utterance input (wake up word) (e.g., Hi Bixby) (hereinafter referred to as a "start utterance") to start the voice recognition service of the user.

The above information is presented as background information only to assist with an understanding of the disclosure. No determination has been made, and no assertion is made, as to whether any of the above might be applicable as prior art with regard to the disclosure.

SUMMARY

In the conventional electronic device, a plurality of devices simultaneously respond to a start utterance (e.g., Hi Bixby) when a plurality of voice recognizing devices are capable of responding to a voice command. To solve this issue, a technology in which all electronic devices receiving an utterance input to start a voice input service do not respond and only the selected one electronic device responds to the start utterance of a user is being applied. In the technology, when a device (TV ON or playing music) generating sound depending on the usage environment is present, another device, not a device that the user desires, responds to the start utterance of the user.

Furthermore, the voice recognizing device corresponding to the start utterance of the user may not be set in detail depending on the user's intent.

Aspects of the disclosure are to address at least the above-mentioned problems and/or disadvantages and to provide at least the advantages described below.

In accordance with an aspect of the disclosure, an electronic device may include a display, a microphone, a memory, a communication circuit, and a processor. The processor may be configured to display a user interface for adjusting voice recognition sensitivity of each of a plurality of voice recognizing devices capable of starting a voice recognition service in response to the same start utterance, through the display, to transmit a value of the changed sensitivity to at least part of the plurality of voice recognizing devices when the voice recognition sensitivity is changed through the user interface, to transmit a signal for waiting to receive a first utterance of a user, to the plurality of voice recognizing devices, to receive utterance information corresponding to the first utterance from the plurality of voice recognizing devices, and to update the user interface based on the utterance information.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the disclosure may be described with reference to accompanying drawings. A voice recognizing device (or an electronic device) according to various embodiments will be described. The term "user" used herein may refer to a person who uses a voice recognizing device or may refer to a device (e.g., an artificial intelligence electronic device) that uses a voice recognizing device.

Figure 1:
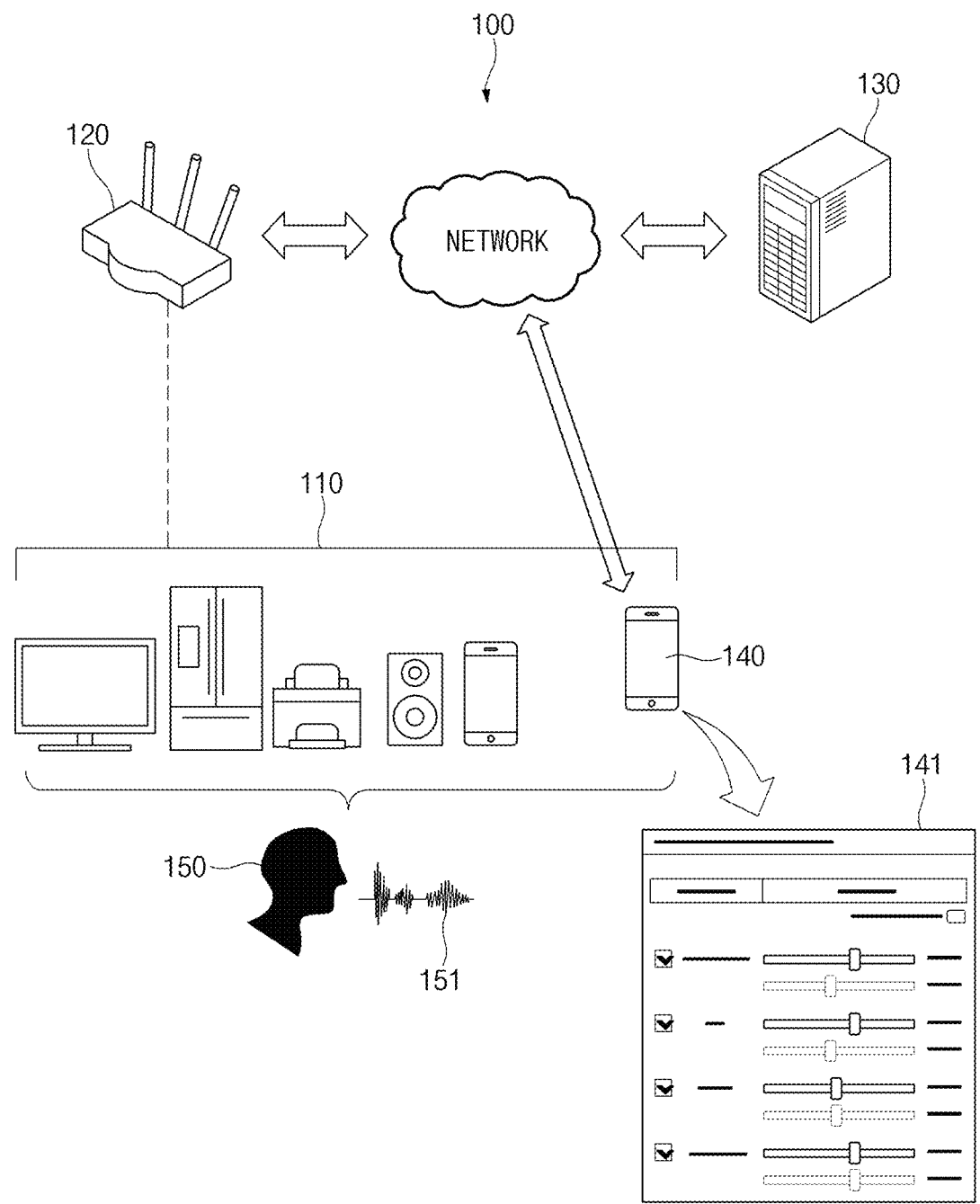
FIG. 1 illustrates a view of a voice recognizing system, according to various embodiments.

FIG. 1 illustrates a view of a voice recognizing system, according to various embodiments.

Referring to FIG. 1, a voice recognizing system 100 may include a plurality of voice recognizing devices 110, a network device 120, and an intelligent server 130.

Each of the plurality of voice recognizing devices 110 may receive an utterance input 151 of a user 150. For example, each of the plurality of voice recognizing devices 110 may convert the utterance input 151 of the user 150 into an electrical signal, using a microphone. The internal processor of the plurality of voice recognizing devices 110 may perform an operation corresponding to the utterance input 151 of the user 150, through the analysis in the inside of a device or the analysis of the intelligent server 130.

For example, when the voice recognizing device 110 is a TV, the voice recognizing device 110 may perform a function, such as power turn-on/off, changing a channel, changing a volume, playing a video, or the like, in response to the interactive utterance input of a user.

For example, when the voice recognizing device 110 is a speaker, the voice recognizing device 110 may perform a function, such as power turn-on/off, changing a volume, playing music, or the like, in response to the interactive utterance input of the user.

For another example, when the voice recognizing device 110 is a refrigerator, the voice recognizing device 110 may perform a function, such as adjusting temperature, searching for food information, or the like, in response to the interactive utterance input of the user.

According to various embodiments, start utterances (e.g., Hi Bixby) for starting the voice recognition service may be the same as one another in the plurality of voice recognizing devices 110. For example, in a state where the plurality of voice recognizing devices 110 are positioned at a periphery of the user 150, when the user 150 says "Hi, Bixby", a voice response that the TV, the speaker, and the refrigerator respond at the same time may be generated.

According to various embodiments, at least one (e.g., an electronic device 140) of the plurality of voice recognizing devices 110 may display a user interface 141 for adjusting the voice recognition sensitivity of the plurality of voice recognizing devices 110 for the start utterance 151. An embodiment is exemplified in FIG. 1 as the electronic device 140 (hereinafter referred to as a "control electronic device") of the plurality of voice recognizing devices 110 displays the user interface 141 (hereinafter referred to as an "integrated UI"). However, the disclosure is not limited thereto. Another device (e.g., a TV, a refrigerator, or an AI speaker) of the plurality of voice recognizing devices 110 may display the integrated UI 141.

According to various embodiments, the processor of the control electronic device 140 may receive an input (e.g., a touch input) to adjust the voice recognition sensitivity of the plurality of voice recognizing devices 110, through the integrated UI. The processor of the control electronic device 140 may transmit the changed voice recognition sensitivity to the corresponding voice recognizing device 110.

The network device 120 may be a device that links at least part of the plurality of voice recognizing devices 110 to the network of an external device (e.g., the intelligent server 130) through a short range wireless communication or wired communication in a specified space. For example, the short range wireless communication may include wireless fidelity (Wi-Fi), Wi-Fi Direct, light fidelity (Li-Fi), Bluetooth, Bluetooth low energy (BLE), ZigBee, or the like. For example, the wired communication module may include a local area network (LAN), a power line communication, or a plain old telephone service (POTS). For example, the network device 120 may be an AP device for Wi-Fi communication. For another example, the network device 120 may be a router for Internet connection.

An embodiment is exemplified in FIG. 1 as the control electronic device 140 is connected to a network through separate communication and other voice recognizing devices are connected to a network through the network device 120. However, the disclosure is not limited thereto. For example, as in the other voice recognizing devices, the electronic device 140 may be connected to the same network device 120. For another example, the electronic device 140 may be connected to the network through a first communication scheme (cellular communication); a part (e.g., a TV and a refrigerator) of the plurality of voice recognizing devices 110 may be connected to the network through a second communication scheme (LAN); the other part (e.g., a speaker and a smartphone) of the plurality of voice recognizing devices 110 may be connected to the network through a third communication scheme (Wi-Fi).

The intelligent server 130 may analyze the utterance input 151 of the user 150. The intelligent server 130 may receive at least part of the utterance input 151 from the plurality of voice recognizing devices 110. The intelligent server 130 may analyze the utterance input 151 to transmit information about operations of the plurality of voice recognizing devices 110 corresponding to the utterance input 151 to the plurality of voice recognizing devices 110.

According to various embodiments, the intelligent server 130 may transmit information, which is displayed or set on the integrated UI 141 of the control electronic device 140. For example, the intelligent server 130 may receive the voice recognition sensitivity changed on the integrated UI 141 to transmit the voice recognition sensitivity to the corresponding device.

Figure 2:
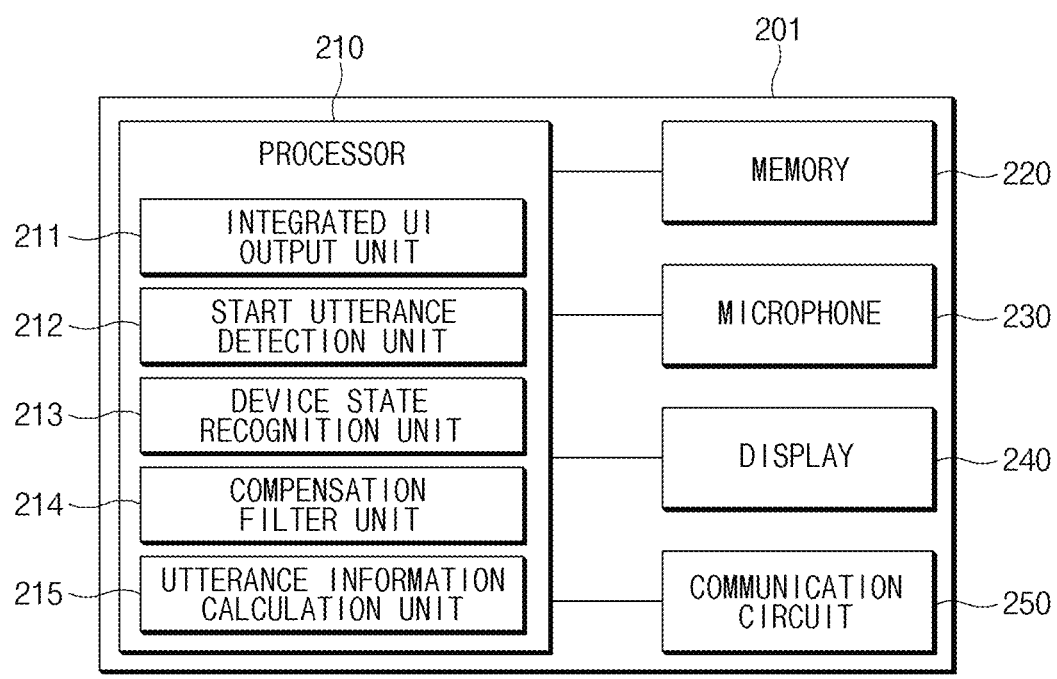
FIG. 2 illustrates a configuration diagram of a voice recognizing device, according to various embodiments.

FIG. 2 illustrates a configuration diagram of a voice recognizing device, according to various embodiments. FIG. 2 is, but is not limited to, an example.

Referring to FIG. 2, a voice recognizing device 201 (e.g., the plurality of voice recognizing devices 110 or the control electronic device 140 of FIG. 1) may include a processor 210, a memory 220, a microphone 230, a display 240, and a communication circuit 250.

The processor 210 may perform various operations necessary for the operation of the voice recognizing device 201. According to an embodiment, the processor 210 may include an integrated UI output unit 211, a start utterance detection unit 212, a device state recognition unit 213, a compensation filter unit 214, and an utterance information calculation unit 215. The configuration is, but is not limited to, a classification according to the function associated with voice recognition of the processor 210.

The integrated UI output unit 211 may provide an integrated UI that makes it possible to set the voice recognition sensitivity of each of devices, which is based on a user account or which is connected to the same short range communication network device (e.g., WIFI-AP).

When a user generates a start utterance (e.g., "Hi, Bixby"), the start utterance detection unit 212 may analyze the voice pattern of a voice input received through the microphone 230 to recognize whether the start utterance is the voice corresponding to the start utterance.

According to an embodiment, the start utterance detection unit 212 may recognize the start utterance through Digital Signal Processor (DSP) or a recognition engine using a low-power chip. Afterward, the start utterance detection unit 212 may transmit audio data including a voice signal to the recognition engine of an Application Processor (AP) to detect whether the start utterance is generated finally.

The device state recognition unit 213 may store state information according to the operation state of the voice recognizing device 201. For example, the operation state information may include a media playback situation, a volume size, or the like. For another example, the operation state information may be information about a sound (the sound of a speaker, and the operating sound of the compressor of a refrigerator) generated by the internal component of an electronic device.

For example, the operation state information may include information about whether the voice recognizing device 201 is playing music, whether the voice recognizing device 201 is playing a video, whether a volume is muted, whether a washing machine is dewatering, what the set temperature of the air conditioner is, or the like.

The compensation filter unit 214 may perform an arithmetic operation using a compensation value for correcting signal-to-noise ratio (SNR) based on the noise generated by the voice recognizing device 201 and the noise generated in the surroundings. The compensation value may be stored in advance or may be changed after being calculated in real time.

The utterance information calculation unit 215 may calculate and collect utterance information (e.g., audio quality, sound pressure, the feature value of an utterance input, or the like) to which the compensation value is applied and then may store the calculated and collected utterance information. The feature value may be at least one of the voice pattern, the average sound pressure, the differences between highest sound pressure and lowest sound pressure, the sound interval, sound average frequency of the utterance input.

The memory 220 may store various pieces of information necessary for the operation of the voice recognizing device 201. According to an embodiment, the memory 220 may store the voice recognition sensitivity set through the integrated UI 141.

The microphone 230 may collect the utterance input of a user to convert the collected utterance input into an electrical signal. The display 240 may display various pieces of content necessary for the operation of the voice recognizing device 201. The communication circuit 250 may communicate with an external device.

Figure 3:
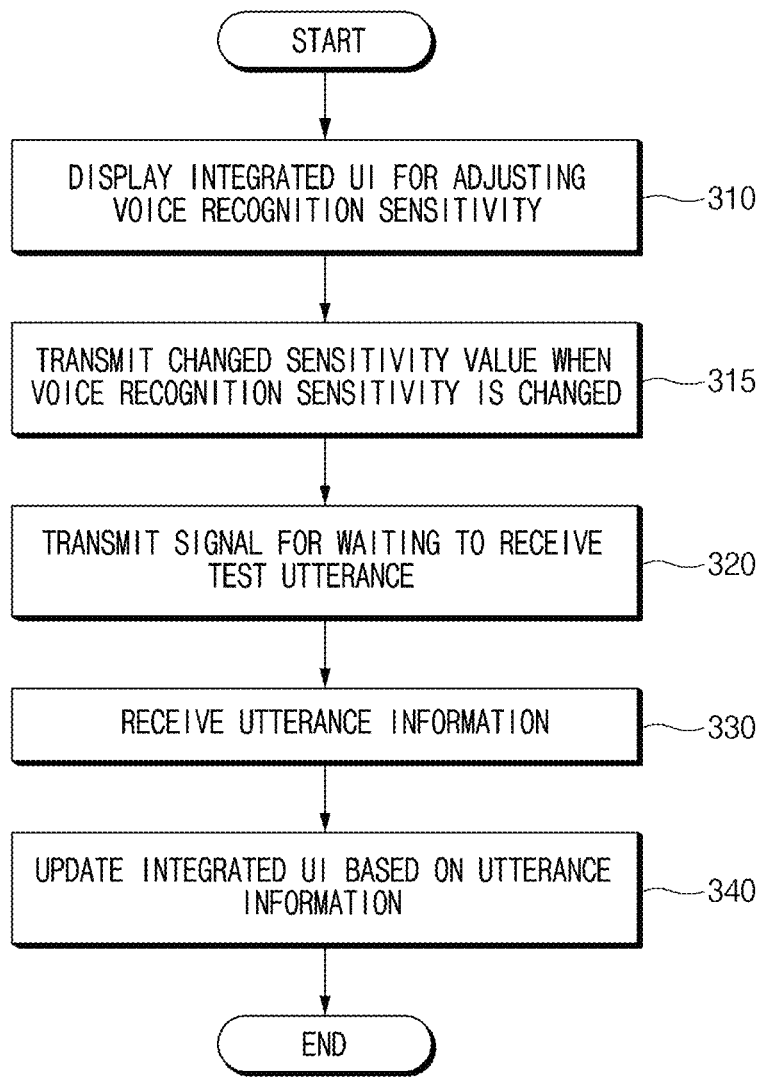
FIG. 3 illustrates a flowchart associated with a method in which a control electronic device controls a voice recognizing device, according to various embodiments.

FIG. 3 illustrates a flowchart associated with a method in which a control electronic device controls a voice recognizing device, according to various embodiments.

Referring to FIG. 3, in operation 310, the processor 210 of the control electronic device 140 may display the integrated UI 141 for adjusting the voice recognition sensitivity of each of the plurality of voice recognizing devices 110.

The integrated UI 141 may include a list of the controllable plurality of voice recognizing devices 110. The plurality of voice recognizing devices 110 may be a device configured to operate in response to the same start utterance.

According to various embodiments, the processor 210 may receive the list from the intelligent server 130 or the network device 120 or may generate the list by establishing a communication channel separately from the plurality of surrounding voice recognizing devices 110.

According to various embodiments, the processor 210 may change the order of the list under the specified condition. For example, a device running after power is turned on, a device in which a user input is generated most recently, and a device in which the usage frequency is the highest in the corresponding time by analyzing a device usage pattern of the user through machine learning may be displayed at the top of the list.

According to various embodiments, the integrated UI 141 may display the voice recognition sensitivity set for each of the plurality of voice recognizing devices 110. For example, the voice recognition sensitivity may be displayed as a scroll bar or a numeric input field. The voice recognition sensitivity may be changed in response to the specified user input (e.g., touch input).

In operation 315, the processor 210 may transmit the changed sensitivity value to the corresponding device among the plurality of voice recognizing devices 110, when the voice recognition sensitivity is changed through the integrated UI 141. When receiving the voice recognition sensitivity, the plurality of voice recognizing devices 110 may use the first utterance (an utterance for testing the voice recognition sensitivity, hereinafter referred to as "test utterance") occurring afterward, for correction.

In operation 320, the processor 210 may transmit a signal for waiting to receive the test utterance of the user, to the plurality of voice recognizing devices 110 included in the list of the integrated UI 141.

According to various embodiments, when the control electronic device 140 is included in the list, the processor 210 may operate the microphone 230 to enter a state where the test utterance of the user is capable of being received.

In operation 330, the processor 210 may receive utterance information corresponding to the test utterance from the plurality of voice recognizing devices 110 included in the list of the integrated UI 141. For example, the utterance information may be an SNR value of the test utterance received from each of the plurality of voice recognizing devices 110.

In operation 340, the processor 210 may update the integrated UI 141 based on the utterance information. For example, the processor 210 may display the SNR value for the test utterance of each of the plurality of voice recognizing devices 110, on the integrated UI 141 in response to the utterance information. According to an embodiment, the processor 210 may display the SNR value in the form of a graph changing in real time.

According to an embodiment, the utterance information may be displayed in the manner of comparing the utterance information with the voice recognition sensitivity set for each of the plurality of voice recognizing devices 110 included in the integrated UI 141. For example, when the set voice recognition sensitivity is displayed in a scroll bar shape of a first color (e.g., grey), the SNR value may be displayed in a graph shape of a second color (e.g., blue) overlapping with the scroll bar.

For example, when the user selects a refrigerator performing general refrigeration/freeze functions together with the TV broadcasting music among the plurality of voice recognizing devices 110 through the integrated UI 141 to change respective voice input sensitivity, the processor 210 may display a guide message for inducing the test utterance to the user.

When the user starts and terminates the test utterance depending on the guide message, the processor 210 may receive the utterance information from each of the TV and the refrigerator and may display a reception value obtained by receiving a test input in each voice recognition device (a TV or a refrigerator), on the integrated UI 141.

According to an embodiment, the integrated UI 141 to which the utterance information is reflected may indicate a device indication (e.g., an icon, a color, a text, or the like), in which the voice recognition state is not good, based on voice strength (dB) of the user, device operation state information, ambient noise information, or the like. For example, each of the voice recognizing devices 110 may determine whether a device is capable of responding based on the utterance information to which the set voice recognition sensitivity, operation state information, ambient noise information, or the like is reflected (whether a reception value by utterance information exceeds a reference value of voice recognition sensitivity), whether a device has the reduced recognition rate because ambient noise/self-noise is great in the response, or the like and then may transmit the corresponding information to the control electronic device 140 together.

After receiving the corresponding information, the integrated UI 141 may notify the user that the voice recognition state of the corresponding voice recognizing device 110 is not good due to the noise, or the like, through an icon, a color, a text, or the like. In an embodiment, the integrated UI 141 may change the volume of the corresponding device, a device operation state, or the like (temporarily reduce the volume or pause the operation of a device when the corresponding device desires a response) and then may display a notification that the performance of voice recognition is improved.

Figure 4:
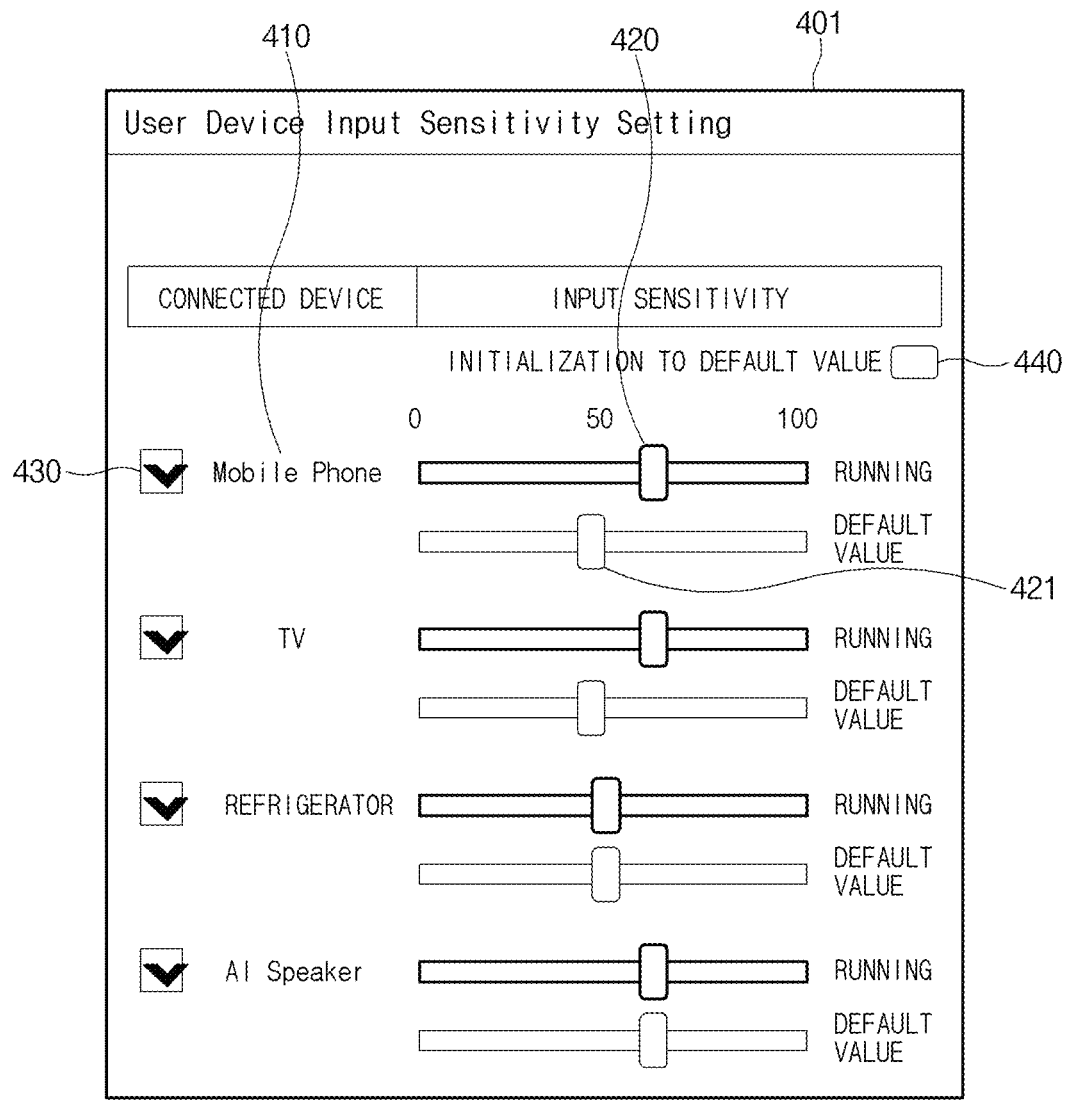
FIG. 4 illustrates an integrated UI, according to various embodiments.

FIG. 4 illustrates an integrated UI, according to various embodiments. FIG. 4 is, but is not limited to, an example.

Referring to FIG. 4, the processor 210 of the control electronic device 140 may display an integrated UI 401 (e.g., the integrated UI 141 of FIG. 1) for adjusting the voice recognition sensitivity for a start utterance of each of the plurality of voice recognizing devices 110.

The integrated UI 401 may include an identifier (e.g., a name, a type, or a model name) 410 of each of the plurality of voice recognizing devices 110, a sensitivity adjustment object 420 for adjusting the voice recognition sensitivity, a default value indication 421, a reception exception object 430 that makes it possible to exclude the reception of a test utterance, and an initialization object 440.

The identifier 410 may be an indication for identifying the plurality of voice recognizing devices 110. According to an embodiment, when the device of the same type is not present, the identifier 410 may be displayed as a type (a TV, a speaker, or a refrigerator). When the device of the same type is present, the identifier 410 may display a model name together.

The sensitivity adjustment object 420 may be an object for changing the voice recognition sensitivity of each device in response to a user input. When the user generates a specified input (e.g., touch input) on the sensitivity adjustment object 420 and then moves the sensitivity adjustment object 420, the processor 210 may transmit the sensitivity value corresponding to the voice input sensitivity adjusted by the user, to the corresponding voice recognizing device 110. For example, when the sensitivity adjustment object 420 is moved to the left, the reference value of the voice recognition sensitivity may be lowered. In this case, even when the SNR value for the test utterance is low, the voice recognizing device 110 may output a response signal corresponding to the start utterance. For another example, when the sensitivity adjustment object 420 is moved to the right, the reference value of the voice recognition sensitivity may be high. In this case, even when the SNR value for the test utterance is high, the voice recognizing device 110 may not output a response signal corresponding to the start utterance.

The default value indication 421 may indicate the default value of the voice recognition sensitivity. While identifying the reference of sensitivity, the user may move the sensitivity adjustment object 420.

The reception exception object 430 may be an object for setting the corresponding voice recognizing device so as not to receive the start utterance or test utterance of the user. When the reception exception object 430 is checked, the sensitivity adjustment object 420 may be deactivated.

The initialization box 440 may be an object for changing all the sensitivity adjustment objects 420 included in the list to the default value. When the initialization box 440 is checked, all the sensitivity adjustment objects 420 may be initialized.

Figure 5:
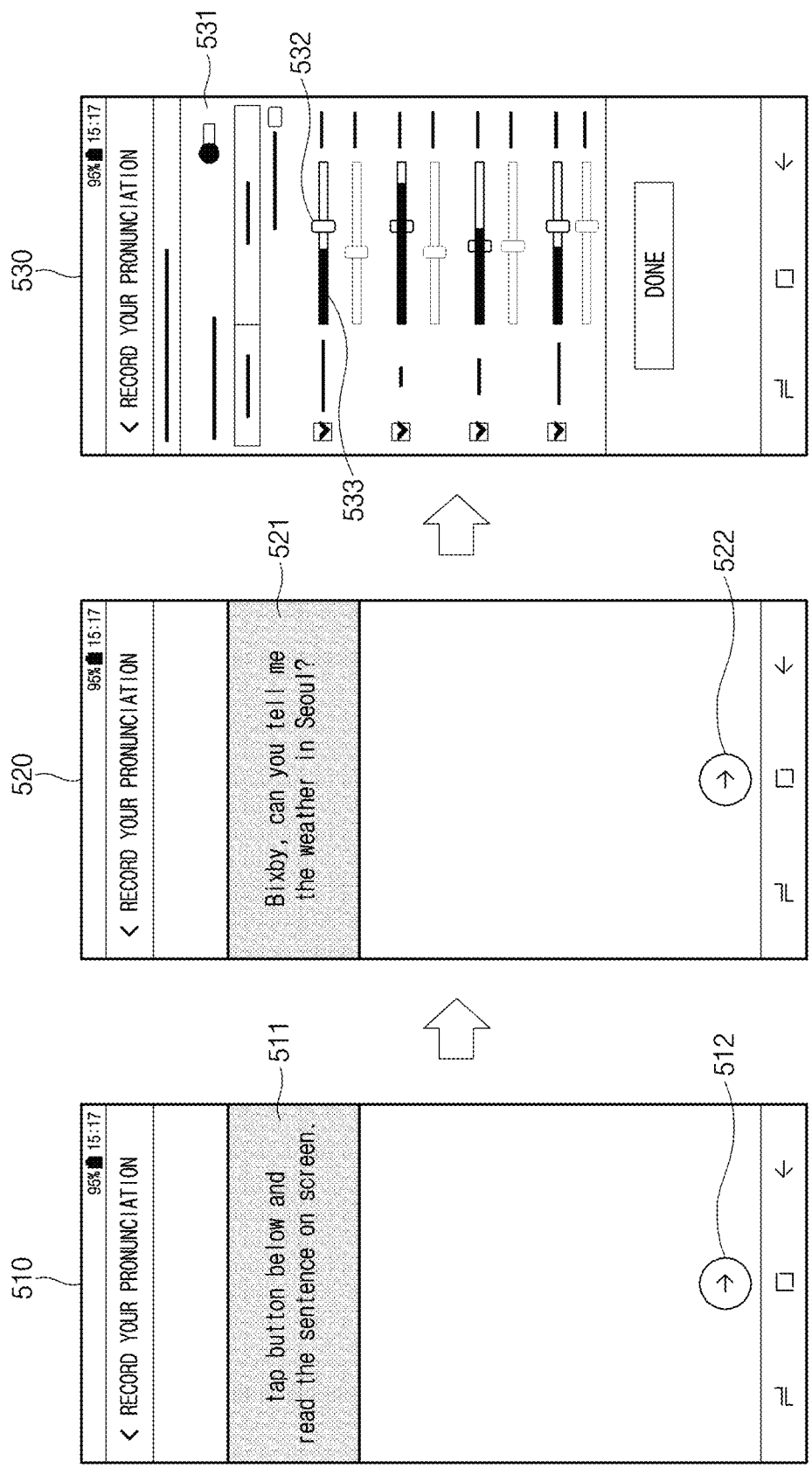
FIG. 5 illustrates a screen changing view according to manual settings of voice recognition sensitivity, according to various embodiments.

FIG. 5 illustrates a screen changing view according to manual settings of voice recognition sensitivity, according to various embodiments.

Referring to FIG. 5, the processor 210 of the control electronic device 140 may display a first user interface 510 for inducing the setting of voice recognition sensitivity. According to an embodiment, when an application managing the plurality of voice recognizing devices 110 registered with a user account is executed and an option for setting reception sensitivity in a setting menu is selected, the processor 210 may display the first user interface 510.

The first user interface 510 may include a guide message 511 and a start button 512. The guide message 511 may describe an operation that a user needs to perform, for the manual setting of voice recognition sensitivity. The start button 512 may make it possible to start a procedure of setting voice reception sensitivity, in response to the touch input of the user. According to an embodiment, when the user touches the start button 512, the processor 210 may transmit a signal, which makes it possible to wait for the reception of a test utterance of the user, to each of the voice recognizing devices 110.

When the user touches the start button 512, the processor 210 may display a second user interface 520. The second user interface 520 may include a test utterance indication 521 and a complete button 522.

The test utterance indication 521 may display a test utterance (e.g., "Bixby, can you tell me the weather in Seoul") that the user needs to utter. An embodiment is exemplified in FIG. 5 as the test utterance is displayed in the text manner. However, the disclosure is not limited thereto. For example, the test utterance indication 521 may be guided with a voice through a speaker of the control electronic device 140.

When the user generates a test utterance corresponding to the test utterance indication 521 and then touches the complete button 522, the processor 210 may display a third user interface 530. The third user interface 530 may include an integrated UI 531. The integrated UI 531 may be the same as or similar to the integrated UI 401 in FIG. 4.

A sensitivity adjustment object 532 may be an object for changing the voice recognition sensitivity of each device in response to a user input. When the user generates a specified input (e.g., touch input) on the sensitivity adjustment object 532 and then moves the sensitivity adjustment object 532, the processor 210 may transmit the sensitivity value corresponding to the voice input sensitivity adjusted by the user, to the corresponding voice recognizing device 110.

An utterance information graph 533 may display utterance information (e.g., a SNR value) of a test utterance based on test utterance information of the user received by each voice recognizing device.

According to an embodiment, the utterance information may be displayed in the manner of comparing the utterance information with the voice recognition sensitivity set for each of the plurality of voice recognizing devices 110 included in the integrated UI 531. For example, when the set voice recognition sensitivity is displayed in a scroll bar shape of a first color (e.g., grey), the utterance information may be displayed in a graph shape of a second color (e.g., blue) overlapping with the scroll bar.

According to various embodiments, the processor 210 may separately display a sensitivity graph 533 depending on the recognition rate of each of the voice recognizing devices 110. For example, the sensitivity graph 533 may be displayed in red by reflecting the fact that the recognition rate of the TV or the speaker among the voice recognizing devices 110 capable of corresponding to the test utterance is dropped due to self-noise or the like. For another example, the sensitivity graph 533 may be displayed in green by reflecting the fact that the self-noise of a lamp or a refrigerator among devices capable of corresponding to the test utterance is relatively small.

Figure 6:
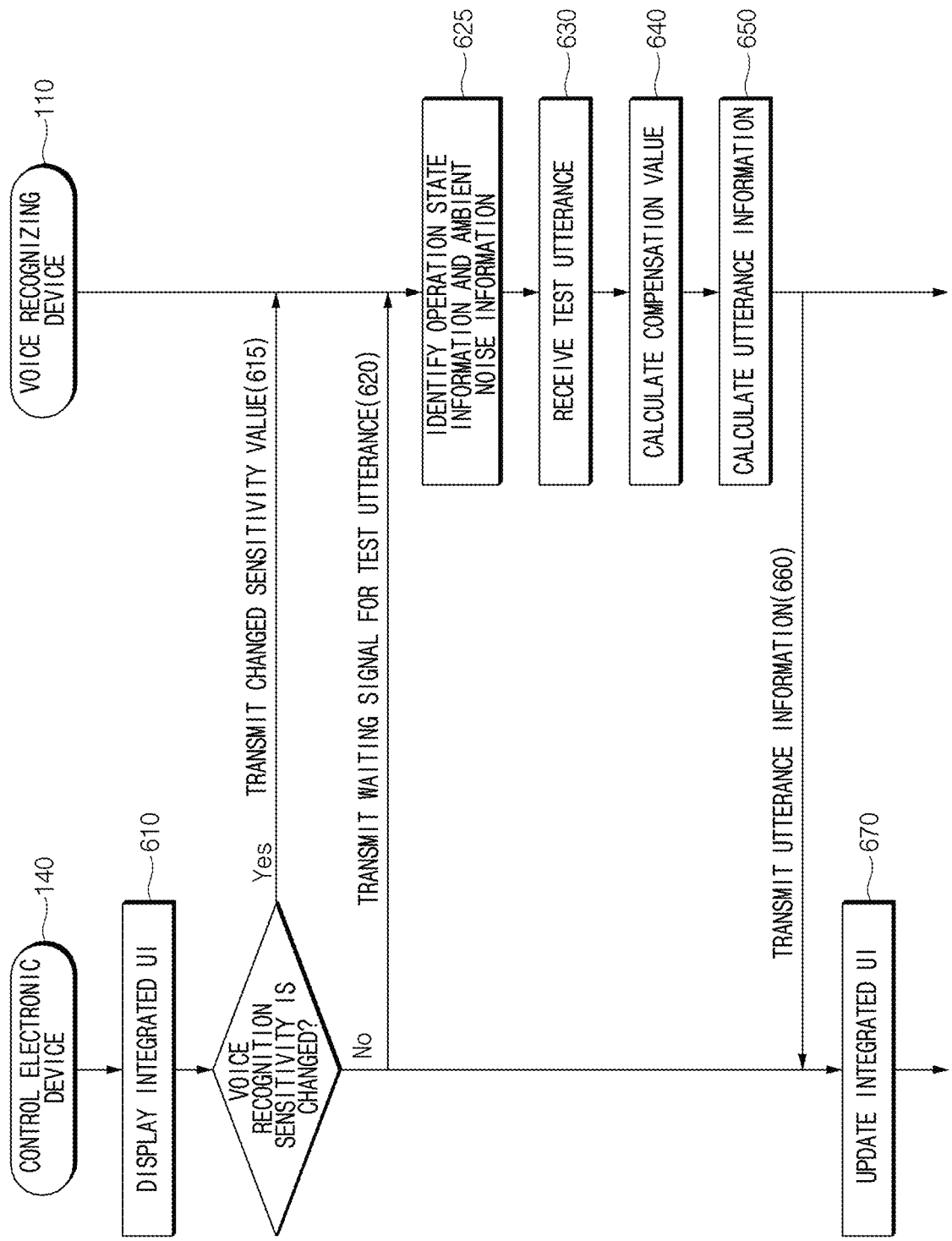
FIG. 6 illustrates a flowchart of a signal between a control electronic device and a voice recognizing device, according to various embodiments.

FIG. 6 illustrates a flowchart of a signal between a control electronic device and a voice recognizing device, according to various embodiments.

Referring to FIG. 6, in operation 610, the control electronic device 140 may display the integrated UI 141 for adjusting the voice recognition sensitivity of each of the plurality of voice recognizing devices 110. The integrated UI 141 may include the identifier (e.g., the name, the type, or the model name) of the plurality of voice recognizing devices 110, an object for adjusting voice recognition sensitivity, and the like.

In operation 615, the control electronic device 140 may transmit the changed sensitivity value to the corresponding voice recognizing device 110, when the voice recognition sensitivity is changed through the integrated UI 141.

In operation 620, the control electronic device 140 may transmit a signal for waiting to receive the test utterance of the user, to the plurality of voice recognizing devices 110 included in the list of the integrated UI 141.

According to various embodiments, in operation 625, the voice recognizing device 110 may identify the operation state information and the ambient noise information of the voice recognizing device 110. For example, the operation state information may include a media playback situation, a volume size, or the like. The ambient noise information may be information about the strength and pattern of the noise signal collected through the speaker of the voice recognizing device 110.

According to various embodiments, when receiving instructions such as power turn-on/off, changing a volume, and the like, each of the voice recognizing devices 110 may calculate and store the operation state information and the ambient noise information in advance.

According to an embodiment, even when not receiving the test utterance of a user, each of the voice recognizing devices 110 (e.g., an intelligence agent) may store the information in advance.

In operation 630, the voice recognizing device 110 may receive the test utterance through a speaker. According to an embodiment, the test utterance may be set to be the same as the start utterance of the voice recognizing device 110 (e.g., "Hi, Bixby") or may be set to be different from the start utterance (e.g., "Hi, Bixby") of the voice recognizing device 110 (e.g., start utterance: "Hi, Bixby", test utterance: "Bixby, can you tell me the weather in Seoul").

In operation 640, the voice recognizing device 110 may calculate the compensation value for the test utterance received based on the changed sensitivity value, the operation state information, and the ambient noise information, which are received. For example, when the voice recognizing device 110 is a TV device and is playing a video, the voice recognizing device 110 may increase the compensation value.

In operation 650, the voice recognizing device 110 may calculate the utterance information about the test utterance received based on the compensation value. The utterance information may include audio quality, sound pressure, the voice signal of the test utterance, the feature value of the test utterance, or the like, to which the compensation value is applied.

The processor of the voice recognizing device 110 may use the voice recognition sensitivity, which the user changes through the integrated UI 510, to calculate or determinate the compensation value or the like for calculating a microphone volume and an SNR value.

Each of the voice recognizing devices 110 may calculate the compensation value for the received test utterance based on at least one of voice input sensitivity/operation state information/ambient noise information, which are received from the control electronic device 140 or may select one of predetermined compensation values (e.g., a table for compensation values).

For example, when the received voice input sensitivity is set to the relatively low value, the voice recognizing device 110 may increase the compensation value. Even when the SNR value is low, the voice recognizing device 110 may output a response signal corresponding to the start utterance. On the other hand, when the received voice input sensitivity is set to the relatively high value, the voice recognizing device 110 may decrease the compensation value. Even when the SNR value is high, the voice recognizing device 110 may not output the response signal corresponding to the start utterance.

For another example, when the sound is generated by the internal component (e.g., a speaker) of the voice recognizing device 110, the voice recognizing device 110 may increase the compensation value. On the other hand, when the sound is not generated by the internal component (e.g., a speaker) of the voice recognizing device 110, the voice recognizing device 110 may decrease the compensation value.

For another example, when the ambient noise of the voice recognizing device 110 is greater than the predetermined reference value, the voice recognizing device 110 may increase the compensation value. On the other hand, when the ambient noise of the voice recognizing device 110 is less than the predetermined reference value, the voice recognizing device 110 may decrease the compensation value.

In operation 660, the voice recognizing device 110 may transmit the utterance information to the control electronic device 140

According to an embodiment, the voice recognizing device 110 may transmit the utterance information to the control electronic device 140 based on address information (e.g., IP address) set by the intelligent server 130 or the network device 120.

According to various embodiments, when the plurality of voice recognizing devices 110 supporting voice recognition are registered with the same account in the intelligent server 130 or a network device (or hub device) 120, each of the voice recognizing devices 110 may transmit the input sensitivity for the test utterance and utterance information about the test utterance, to the intelligent server 130 or the network device (or hub device) 120. The intelligent server 130 or the network device 120 may transmit the utterance information received from each of the voice recognizing devices 110, to the control electronic device 140.

In operation 670, the control electronic device 140 may update the integrated UI 141 based on the utterance information. The control electronic device 140 may display a reception value for the test utterance of each of the plurality of voice recognizing devices 110 on the integrated UI 141 in response to the utterance information. According to an embodiment, the processor 210 may display the reception value in the form of a graph changing in real time.

Figure 7:
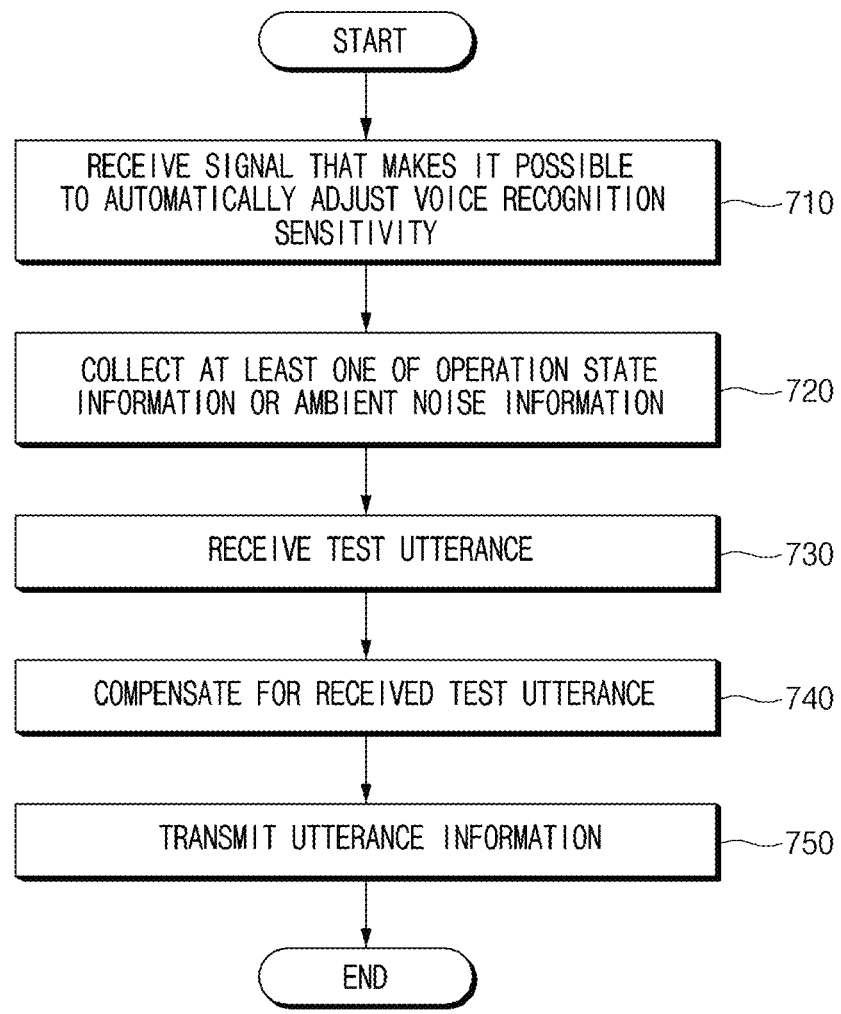
FIG. 7 illustrates a flowchart for automatically adjusting voice recognition sensitivity, according to various embodiments.

FIG. 7 illustrates a flowchart for automatically adjusting voice recognition sensitivity, according to various embodiments.

Referring to FIG. 7, in operation 710, the voice recognizing device 110 may receive a signal that makes it possible to automatically adjust the voice recognition sensitivity, from the control electronic device 140.

For example, the control electronic device 140 may display the integrated UI 141. The integrated UI 141 may include an object (e.g., a selection button or a check box) for automatically adjusting the voice recognition sensitivity in each of the voice recognizing devices 110. When a specified user input (e.g., touch input) occurs in the object, the control electronic device 140 may transmit a signal, which instructs each of the voice recognizing devices 110 to automatically set the voice recognition sensitivity, to each of the voice recognizing devices 110.

In operation 720, the voice recognizing device 110 may collect at least one of the operation state information or the ambient noise information of the voice recognizing device 110, through a microphone. For example, the operation state information may include a media playing state, a volume size or the like.

The ambient noise information may be information about the strength and pattern of the collected noise signal, through the speaker of the voice recognizing device 110. In an embodiment, the voice recognizing device 110 may collect the ambient noise information, periodically or when a specified operation (e.g., power turn-on/off, adjusting a channel, or the like) is performed.

According to an embodiment, the voice recognizing device 110 may collect the ambient noise information depending on the predetermined period. According to another embodiment, the voice recognizing device 110 may collect the ambient noise information, when the utterance input of the user is scheduled to be received (e.g., when a signal to wait for the reception of the test utterance is received), when the utterance input of the user is being received, or when the reception is completed.

In operation 730, the voice recognizing device 110 may receive the test utterance of the user. According to an embodiment, the test utterance may be set to be the same as the start utterance of the voice recognizing device 110 (e.g., "Hi, Bixby") or may be set to be different from the start utterance (e.g., "Hi, Bixby") of the voice recognizing device 110 (e.g., start utterance: "Hi, Bixby", test utterance: "Bixby, can you tell me the weather in Seoul").

In operation 740, the voice recognizing device 110 may calculate the utterance information by compensating for the received test utterance based on at least one of the operation state information or the noise information The utterance information may include the audio quality for the test utterance, the sound pressure for the test utterance, the feature value of the utterance input, or the like.

The voice recognizing device 110 may determine a compensation value based on at least one of the operation state information or the noise information. For example, when the voice recognizing device 110 is in an operation state, the compensation value may be positive '+'. When the ambient noise is high, the compensation value may be positive '+'.

The voice recognizing device 110 may calculate an amplification value, the starting point of voice, the end point of voice, voice volume, noise volume, or the like for the received test utterance based on the compensation value.

In operation 750, the voice recognizing device 110 may transmit the utterance information to an external device. The voice recognizing device 110 may transmit the utterance information to the control electronic device 140 or the intelligent server 130. The control electronic device 140 may update the integrated UI 141 based on the utterance information.

Figure 8:
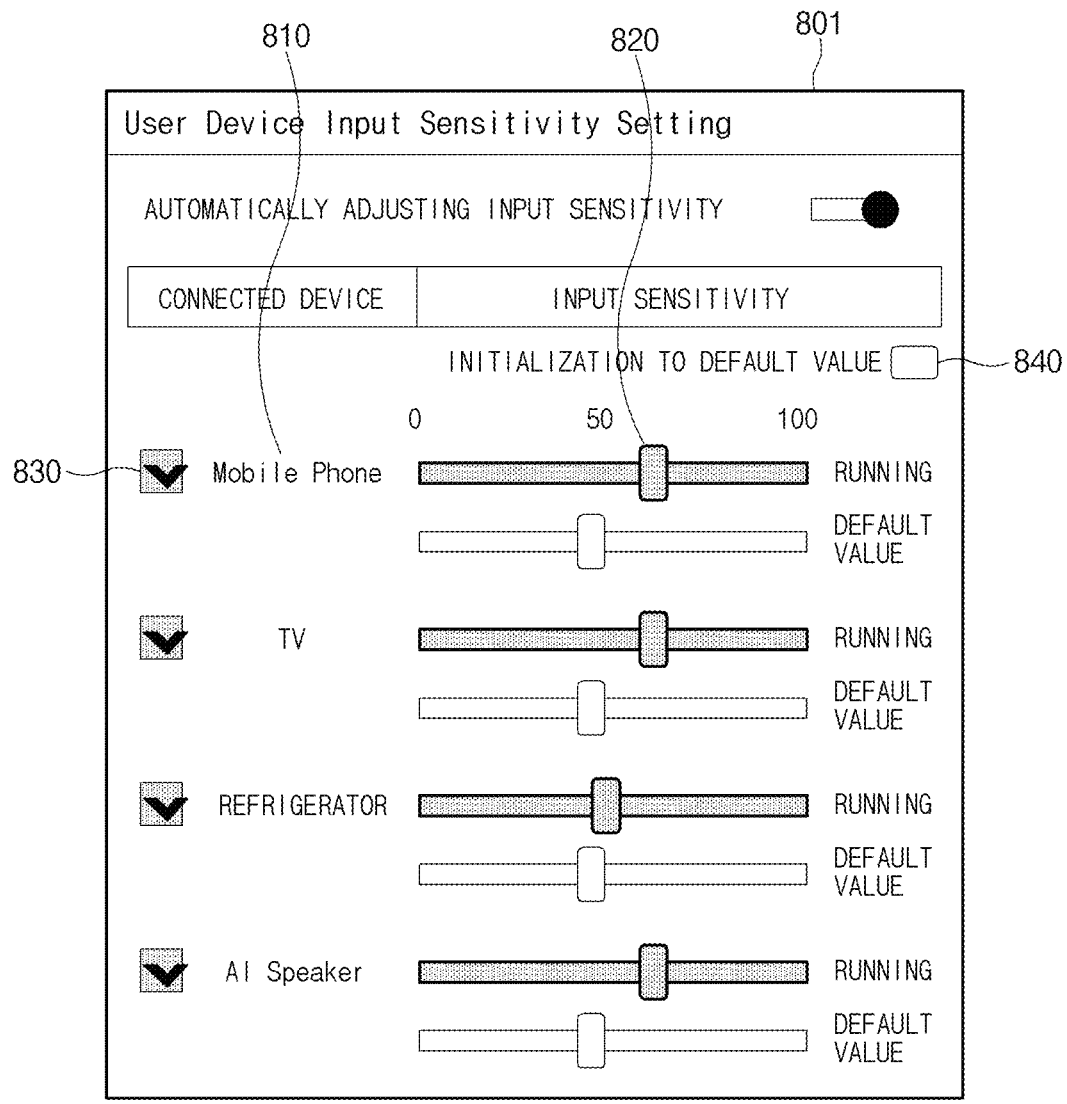
FIG. 8 illustrates an exemplary view of an integrated UI, according to various embodiments.

FIG. 8 illustrates an exemplification view of an integrated UI associated with automatic settings of voice recognition sensitivity, according to various embodiments. However, FIG. 8 is exemplary, and the disclosure is not limited thereto.

Referring to FIG. 8, the processor 210 of the control electronic device 140 may display an integrated UI 801 (e.g., the integrated UI 141 of FIG. 1) for adjusting the voice recognition sensitivity for a start utterance of each of the plurality of voice recognizing devices 110.

The integrated UI 801 may include the identifier (e.g., a name, a type, or a model name) 810 of each of the plurality of voice recognizing devices 110, a sensitivity adjustment object 820 for adjusting the voice recognition sensitivity, a default value indication 821, a reception exception object 830 that makes it possible to exclude the reception of a test utterance, and an initialization object 840.

According to various embodiments, the integrated UI 801 may further include an object 850 (hereinafter referred to as an "automatic adjustment object") for automatically adjusting the voice recognition sensitivity of each of the plurality of voice recognizing devices 110.

An embodiment is exemplified in FIG. 8 as the automatic adjustment object 850 is implemented with a selection button. However, an embodiment is not limited thereto. For example, the automatic adjustment object 850 may be implemented in the form of a check box.

When the state of the automatic adjustment object 850 is changed to an activated state by a user input, the control electronic device 140 may transmit a signal, which instructs each of the voice recognizing devices 110 to automatically set the voice recognition sensitivity, to each of the voice recognizing devices 110. Moreover, in this case, the control electronic device 140 may deactivate the sensitivity adjustment object 820 in the integrated UI 801 and then may not allow the user to manipulate the sensitivity adjustment object 820.

Figure 9:
FIG. 9 illustrates a change of utterance information according to automatic correction, according to various embodiments.

FIG. 9 illustrates a change of utterance information according to automatic correction, according to various embodiments. FIG. 9 is, but is not limited to, an example.

Referring to FIG. 9, in Table 901, the voice recognizing device 110 may receive the test utterance of a user and then may correct a reception value based on at least one of operation state information or ambient noise information. An embodiment is exemplified in FIG. 9 as the reception value is corrected based on operation state information. However, the disclosure is not limited thereto.

For example, the voice recognizing devices 110 such as a mobile phone, a TV, a refrigerator, an AI speaker and the like may receive the test utterance of a user and may collect SNR.

Each of the voice recognizing devices 110 may correct the SNR depending on the operation state. When the TV is turned on and then generates a sound, the TV may change the SNR value for the test utterance based on the volume size to be higher. As the volume size increases, the compensation value to be added may increase. For another example, when the AI speaker is turned on and then plays music, the AI speaker may change the SNR value for the test utterance based on the volume size to be higher. As the volume size increases, the compensation value to be added may increase.

Each of the voice recognizing devices 110 may transmit the corrected SNR value to the control electronic device 140.

Figure 10:
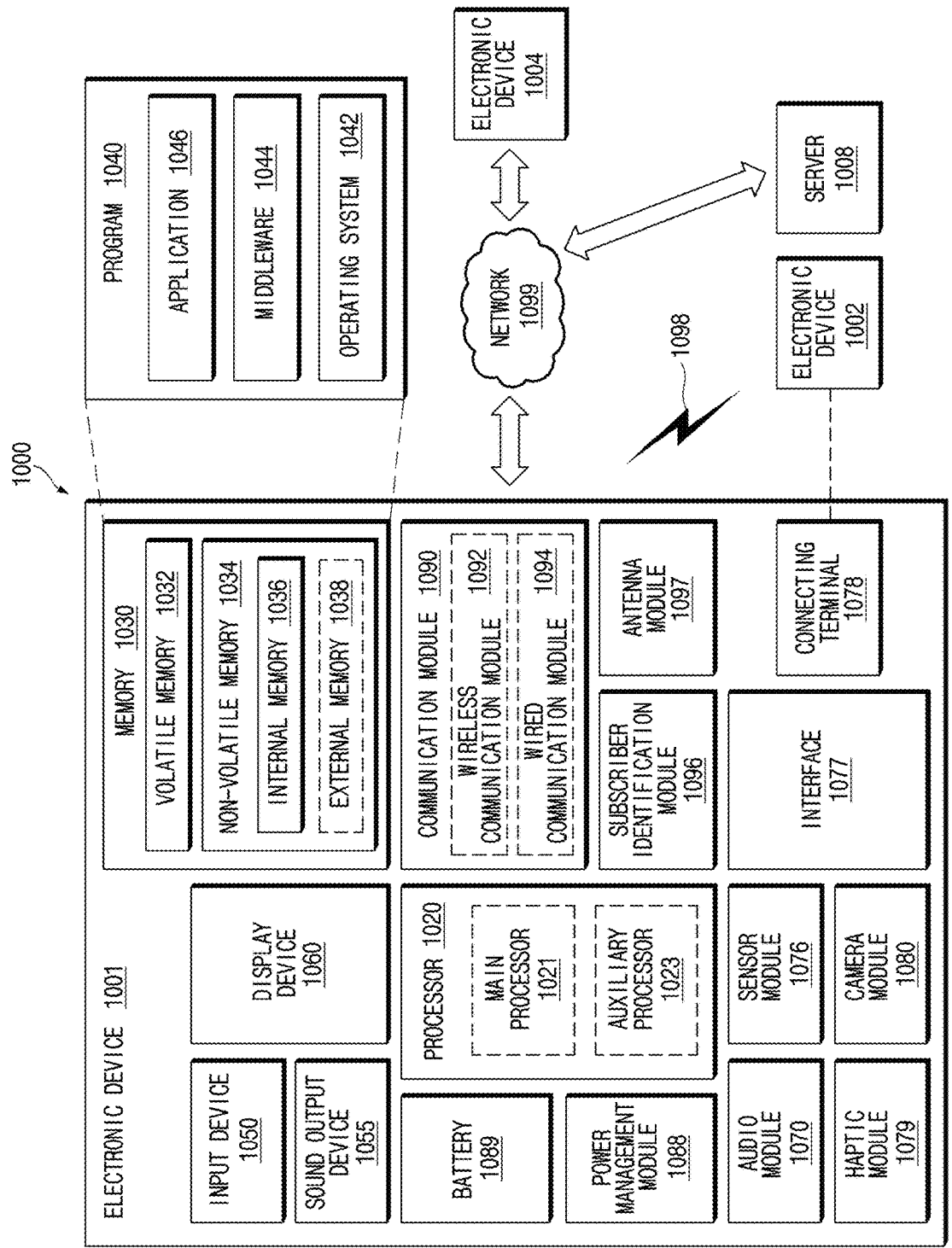
FIG. 10 illustrates a block diagram of an electronic device in a network environment, according to various embodiments.

FIG. 10 illustrates a block diagram of an electronic device 1001 (e.g., the plurality of voice recognizing devices 110 or the control electronic device 140 of FIG. 1) in a network environment 1000, according to various embodiments. An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, personal digital assistant (PDA), a portable multimedia player (PMP), a Motion Picture Experts Group (MPEG-1 or MPEG-2) Audio Layer 3 (MP3) player, a mobile medical device, a camera, or a wearable device. According to various embodiments, a wearable device may include at least one of an accessory type of device (e.g., a timepiece, a ring, a bracelet, an anklet, a necklace, glasses, a contact lens, or a head-mounted device (HMD)), a one-piece fabric or clothes type of device (e.g., electronic clothes), a body-attached type of device (e.g., a skin pad or a tattoo), or a bio-implantable type of device (e.g., implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 10, the electronic device 1001 in the network environment 1000 may communicate with an electronic device 1002 over a first network 1098 (e.g., a short range wireless communication network) or may communicate with an electronic device 1004 or a server 1008 over a second network 1099 (e.g., a long distance wireless communication network). According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, or an antenna module 1097. In any embodiment, at least one (e.g., the display device 1060 or the camera module 1080) of the components may be omitted from the electronic device

1001, or one or more other components may be further included in the electronic device 1001. In any embodiment, some of the components may be implemented with a single integrated circuit. For example, the sensor module 1076 (e.g., a fingerprint sensor, an iris sensor, or an illumination sensor) may be embedded in the display device 1060 (e.g., a display).

The processor 1020 may execute, for example, software (e.g., a program 1040) to control at least one other component (e.g., a hardware or software component) of the electronic device 1001 connected to the processor 1020, and may perform various data processing or operations. According to an embodiment, as at least a part of the data processing or operations, the processor 1020 may load a command or data received from any other component (e.g., the sensor module 1076 or the communication module 1090) to a volatile memory 1032, may process the command or data stored in the volatile memory 1032, and may store processed data in a nonvolatile memory 1034. According to an embodiment, the processor 1020 may include a main processor 1021 (e.g., a central processing unit or an application processor) and a coprocessor 1023 (e.g., a graphic processing device, an image signal processor, a sensor hub processor, or a communication processor), which may be operated independently of or together with the main processor 1021. Additionally or alternatively, the coprocessor 1023 may be configured to use lower power than the main processor 1021 or to be specialized for a specified function. The coprocessor 1023 may be implemented separately from the main processor 1021 or may be implemented as a part of the main processor 1021.

The coprocessor 1023 may control at least a part of a function or states associated with at least one component (e.g., the display device 1060, the sensor module 1076, or the communication module 1090) of the electronic device 1001, for example, instead of the main processor 1021 while the main processor 1021 is in an inactive (e.g., sleep) state and together with the main processor 1021 while the main processor 1021 is in an active (e.g., an application execution) state. According to an embodiment, the coprocessor 1023 (e.g., an image signal processor or a communication processor) may be implemented as a part of any other component (e.g., the camera module 1080 or the communication module 1090) which is functionally (or operatively) associated with the coprocessor 1023.

The memory 1030 may store various data which are used by at least one component (e.g., the processor 1020 or the sensor module 1076) of the electronic device 1001. The data may include, for example, software (e.g., the program 1040), or input data or output data associated with a command of the software. The memory 1030 may include the volatile memory 1032 or the nonvolatile memory 1034. The nonvolatile memory 1034 may include an internal memory 1036 or an external memory 1038.

The program 1040 may be stored in the memory 1030 as software, and may include, for example, an operating system 1042, a middleware 1044, or an application 1046.

The input device 1050 may receive a commands or data which will be used by a component (e.g., the processor 1020) of the electronic device 1001, from the outside (e.g., a user) of the electronic device 1001. The input device 1050 may include, for example, a microphone, a mouse, or a keyboard.

The sound output device 1055 may output a sound signal to the outside of the electronic device 1001. The sound output device 1055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 1060 may visually provide information to the outside (e.g., the user) of the electronic device 1001. The display device 1060 may include, for example, a display, a hologram device, or a control circuit for controlling a projector and a corresponding device. According to an embodiment, the display device 1060 may include a touch circuitry configured to sense a touch, or a sensor circuitry (e.g., a pressure sensor) configured to measure the strength of force generated by the touch.

The audio module 1070 may convert sound to an electrical signal, or reversely, may convert an electrical signal to sound. According to an embodiment, the audio module 1070 may obtain sound through the input device 1050, or may output sound through the sound output device 1055, or through an external electronic device (e.g., the electronic device 1002) (e.g., a speaker or a headphone) directly or wirelessly connected with the electronic device 1001.

The sensor module 1076 may sense an operation state (e.g., power or a temperature) of the electronic device 1001 or an external environment state (e.g., a user state), and may generate an electrical signal or a data value corresponding the sensed state. According to an embodiment, the sensor module 1076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1077 may support one or more specified protocols that may be used to directly and wirelessly connect the electronic device 1001 with an external electronic device (e.g., the electronic device 1002). According to an embodiment, the interface 1077 may include, for example, a high definition multimedia interface (HDMI), a universal serial bus (USB) interface, a secure digital (SD) card interface, or an audio interface.

A connection terminal 1078 may include a connector that may allow the electronic device 1001 to be physically connected with an external electronic device (e.g., the electronic device 1002). According to an embodiment, the connection terminal 1078 may include, for example, a HDMI connector, a USB connector, a SD card connector, or an audio connector (e.g., a headphone connector).

The haptic module 1079 may convert an electrical signal to a mechanical stimulation (e.g., vibration or movement) or an electrical stimulation which the user may perceive through the sense of touch or the sense of movement. According to an embodiment, the haptic module 1079 may include, for example, a motor, a piezoelectric sensor, or an electrical stimulation device.

The camera module 1080 may photograph a still image and a video. According to an embodiment, the camera module 1080 may include one or more lenses, image sensors, image signal processors, or flashes (or electrical flashes).

The power management module 1088 may manage the power which is supplied to the electronic device 1001. According to an embodiment, the power management module 1088 may be implemented, for example, as at least a part of a power management integrated circuit (PMIC).

The battery 1089 may power at least one component of the electronic device 1001. According to an embodiment, the battery 1089 may include, for example, a primary cell not recharged, a secondary cell rechargeable, or a fuel cell.

The communication module 1090 may establish a direct (or wired) communication channel or a wireless communication channel between the electronic device 1001 and an external electronic device (e.g., the electronic device 1002, the electronic device 1004, or the server 1008) or may perform communication through the established communication channel. The communication module 1090 may include one or more communication processors which is operated independently of the processor 1020 (e.g., an application processor) and supports direct (or wired) communication or wireless communication. According to an embodiment, the communication module 1090 may include a wireless communication module 1092 (e.g., a cellular communication module, a short range wireless communication module, or a global navigation satellite system (GNSS) communication module) or a wired communication module 1094 (e.g., a local area network (LAN) communication module or a power line communication module). A corresponding communication module of such communication modules may communicate with an external electronic device over the first network 1098 (e.g., a short range communication network such as Bluetooth, Wi-Fi direct, or infrared data association (IrDA)) or the second network 1099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1092 may verify and authenticate the electronic device 1001 within a communication network, such as the first network 1098 or the second network 1099, by using subscriber information (e.g., international mobile subscriber identity (IMSI)) stored in the subscriber identification module 1096.

The antenna module 1097 may transmit a signal or a power to the outside (e.g., an external electronic device) or may receive a signal or a power from the outside. According to an embodiment, the antenna module 1097 may include one or more antennas, and at least one antenna which is suitable for a communication scheme used in a computer network such as the first network 1098 or the second network 1099 may be selected, for example, by the communication module 1090 from the one or more antennas. The signal or power may be exchanged between the communication module 1090 and an external electronic device through the selected at least one antenna or may be received from the external electronic device through the selected at least one antenna and the communication module 1090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1001 and the external electronic device 1004 through the server 1008 connecting to the second network 1099. Each of the electronic devices 1002 and 1004 may be a device, the kind of which is the same as or different from a kind of the electronic device 1001. According to an embodiment, all or a part of operations to be executed in the electronic device 1001 may be executed in one or more external devices of the external electronic devices 1002, 1004, or 1008. For example, in the case where the electronic device 1001 should perform any function or service automatically or in response to a request from the user or any other device, the electronic device 1001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 1001. The electronic device 1001 may process received result as it is or additionally, and may provide a result of the processing as at least a part of the response to the request. To this end, for example, a cloud computing, distributed computing, or client-server computing technology may be used.

According to various embodiments, an electronic device (e.g., the electronic device 140 of FIG. 1) includes a display, a microphone, a memory, a communication circuit, and a processor, wherein the processor is configured to display a user interface for adjusting voice recognition sensitivity of each of a plurality of voice recognizing devices configured to start a voice recognition service in response to a same start utterance, through the display, when the voice recognition sensitivity is changed through the user interface, transmit a value of the changed sensitivity to at least part of the plurality of voice recognizing devices, transmit a signal for waiting to receive a first utterance of a user, to the plurality of voice recognizing devices, receive utterance information corresponding to the first utterance from the plurality of voice recognizing devices, and update the user interface based on the utterance information.

According to various embodiments, the user interface includes identification information of each of the plurality of voice recognizing devices and a first object for changing the voice recognition sensitivity.

According to various embodiments, the processor is configured to display the first object through a scroll bar or a numeric input field.

According to various embodiments, the user interface includes at least one of a reference value of the voice recognition sensitivity, a second object for excluding setting of the voice recognition sensitivity of each of the plurality of voice recognizing devices, or a third object for initializing the voice recognition sensitivity.

According to various embodiments, the utterance information is a value corrected based on at least one of audio quality for the first utterance received from the plurality of voice recognizing devices, sound pressure for the first utterance, or a feature value of a test utterance.

According to various embodiments, the utterance information is a value corrected based on at least one of operation states of the plurality of voice recognizing devices or noise information at peripheries of the plurality of voice recognizing devices.

According to various embodiments, the processor is configured to display a first object for adjusting the voice recognition sensitivity and a second object different from the first object to overlap with each other.

According to various embodiments, the processor is configured to display the first object and the second object in different colors.

According to various embodiments, the processor is configured to determine a device that responds to the start utterance, from among the plurality of voice recognizing devices based on the utterance information.

According to various embodiments, when the voice recognition sensitivity is changed, the processor is configured to transmit the value of the changed sensitivity to the plurality of voice recognizing devices through a network device for short range communication or an external server.

According to various embodiments, the electronic device is connected to the plurality of voice recognizing devices through the network device.

According to various embodiments, the processor is configured to receive the utterance information from the plurality of voice recognizing devices through the network device.

According to various embodiments, the start utterance and the first utterance are set to be different from each other.

According to various embodiments, an electronic device (e.g., the electronic device 140 of FIG. 1) includes a display, a microphone, a memory, a communication circuit, and a processor, wherein the processor is configured to collect at least one of operation state information of the electronic device or noise information at a periphery of the electronic device, receive a first utterance of a user, correct the received first utterance based on at least one of the operation state information or the noise information to calculate utterance information, and transmit the utterance information to an external device.

According to various embodiments, the operation state information includes information about sound generated by an internal configuration of the electronic device.

According to various embodiments, the processor is configured to transmit the utterance information through a network device for short range communication or an external server to the external device.

According to various embodiments, the electronic device establishes a communication channel with the external device through the network device.

According to various embodiments, the processor is configured to calculate the utterance information based on at least one of audio quality of the received first utterance, sound pressure of the received first utterance, or a feature value of the first utterance.

According to various embodiments, the utterance information includes a signal-to-noise ratio (SNR) value of the received first utterance.

According to various embodiments, a controlling method of a voice recognizing device is performed by an electronic device may include displaying a user interface for adjusting voice recognition sensitivity of each of a plurality of voice recognizing devices configured to start a voice recognition service in response to a same start utterance, through a display of the electronic device, when the voice recognition sensitivity is changed through the user interface, transmitting a value of the changed sensitivity to at least part of the plurality of voice recognizing devices, transmitting a signal for waiting to receive a test utterance of a user, to the plurality of voice recognizing devices, receiving utterance information corresponding to the test utterance from the plurality of voice recognizing devices, and updating the user interface based on the utterance information.

Each of components (e.g., a module or a program) may include a single entity or a plurality of entities; some of the above-described corresponding sub components may be omitted, or any other sub component may be further included in various embodiments. Alternatively additionally, some components (e.g., a module or a program) may be combined with each other so as to form one entity, so that the functions of the components may be performed in the same manner as before the combination. According to various embodiments, operations executed by modules, program modules, or other components may be executed by a successive method, a parallel method, a repeated method, or a heuristic method. Alternatively, at least some of the operations may be executed in another order or may be omitted, or any other operation may be added.

According to various embodiments of the disclosure, an electronic device may provide a user interface that allows a user to adjust the voice input sensitivity of each of a plurality of voice recognizing devices. While entering a test voice, the user may identify the voice recognition sensitivity of each of various devices through the user interface. The user may adjust the voice recognition sensitivity of a specific voice recognizing device as needed such that a device that the user desires responds to a voice command.

According to an embodiment of the disclosure, an electronic device may automatically set the voice recognition sensitivity so as to be suitable for the device usage environment of the user and then may provide a useful way to set a device, which the user desires, so as to respond to a voice command. Besides, a variety of effects directly or indirectly understood through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a display;
a microphone;
a memory;
a communication circuit; and
a processor,
wherein the processor is configured to:
 display a user interface for adjusting voice recognition sensitivity of each of a plurality of voice recognizing devices configured to start a voice recognition service in response to a same start utterance, through the display;
 when the voice recognition sensitivity is changed through the user interface, transmit a value of the changed sensitivity to at least part of the plurality of voice recognizing devices;
 transmit a signal for waiting to receive a first utterance of a user, to the plurality of voice recognizing devices;
 receive utterance information corresponding to the first utterance from the plurality of voice recognizing devices; and
 update the user interface based on the utterance information.

2. The electronic device of claim 1, wherein the user interface includes identification information of each of the plurality of voice recognizing devices and a first object for changing the voice recognition sensitivity.

3. The electronic device of claim 2, wherein the processor is configured to:
display the first object through a scroll bar or a numeric input field.

4. The electronic device of claim 2, wherein the user interface includes at least one of: a reference value of the voice recognition sensitivity, a second object for excluding setting of the voice recognition sensitivity of each of the plurality of voice recognizing devices, or a third object for initializing the voice recognition sensitivity.

5. The electronic device of claim 1, wherein the utterance information is a value corrected based on at least one of audio quality for the first utterance received from the plurality of voice recognizing devices, sound pressure for the first utterance, or a feature value of a test utterance.

6. The electronic device of claim 1, wherein the utterance information is a value corrected based on at least one of operation states of the plurality of voice recognizing devices or noise information at peripheries of the plurality of voice recognizing devices.

7. The electronic device of claim 1, wherein the processor is configured to:
  display a first object for adjusting the voice recognition sensitivity and a second object different from the first object to overlap with each other.

8. The electronic device of claim 7, wherein the processor is configured to:
  display the first object and the second object in different colors.

9. The electronic device of claim 1, wherein the processor is configured to:
  determine a device, that responds to the start utterance, from among the plurality of voice recognizing devices based on the utterance information.

10. The electronic device of claim 1, wherein the processor is configured to:
  when the voice recognition sensitivity is changed, transmit the value of the changed sensitivity to the plurality of voice recognizing devices through a network device for short range communication or an external server.

11. The electronic device of claim 10, wherein the electronic device is connected to the plurality of voice recognizing devices through the network device.

12. The electronic device of claim 11, wherein the processor is configured to:
  receive the utterance information from the plurality of voice recognizing devices through the network device.

13. The electronic device of claim 1, wherein the start utterance and the first utterance are set to be different from each other.

14. A controlling method of a voice recognizing device performed by an electronic device, the method comprising:
  displaying a user interface for adjusting voice recognition sensitivity of each of a plurality of voice recognizing devices configured to start a voice recognition service in response to a same start utterance, through a display of the electronic device;
  when the voice recognition sensitivity is changed through the user interface, transmitting a value of the changed sensitivity to at least part of the plurality of voice recognizing devices;
  transmitting a signal for waiting to receive a test utterance of a user, to the plurality of voice recognizing devices;
  receiving utterance information corresponding to the test utterance from the plurality of voice recognizing devices; and
  updating the user interface based on the utterance information.

* * * * *